United States Patent
Hong

(10) Patent No.: US 11,792,659 B2
(45) Date of Patent: Oct. 17, 2023

(54) METHOD AND DEVICE FOR USING NETWORK SLICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 236 days.

(21) Appl. No.: 17/293,956

(22) PCT Filed: Nov. 15, 2018

(86) PCT No.: PCT/CN2018/115611
§ 371 (c)(1),
(2) Date: May 14, 2021

(87) PCT Pub. No.: WO2020/097845
PCT Pub. Date: May 22, 2020

(65) Prior Publication Data
US 2022/0014938 A1    Jan. 13, 2022

(51) Int. Cl.
*H04W 24/02* (2009.01)
*H04W 76/27* (2018.01)
*H04W 16/10* (2009.01)
*H04W 48/08* (2009.01)
(Continued)

(52) U.S. Cl.
CPC ........... *H04W 24/02* (2013.01); *H04W 16/10* (2013.01); *H04W 48/08* (2013.01); *H04W 48/16* (2013.01); *H04W 48/18* (2013.01); *H04W 76/27* (2018.02)

(58) Field of Classification Search
CPC ..... H04W 24/02; H04W 76/27; H04W 16/10; H04W 48/08; H04W 48/16; H04W 48/18
See application file for complete search history.

(56) References Cited

U.S. PATENT DOCUMENTS

| | | | |
|---|---|---|---|
| 11,026,121 B2* | 6/2021 | Shih | H04W 28/16 |
| 2016/0353465 A1 | 12/2016 | Vrzic | |
| 2018/0192445 A1 | 7/2018 | Jiang | |

(Continued)

FOREIGN PATENT DOCUMENTS

| CN | 106412905 A | 2/2017 |
|---|---|---|
| CN | 107071799 A | 8/2017 |

(Continued)

OTHER PUBLICATIONS

Office Action of the Indian application No. 202147025640, dated Mar. 11, 2022.

(Continued)

*Primary Examiner* — Wayne H Cai
(74) *Attorney, Agent, or Firm* — SYNCODA LLC; Feng Ma

(57) ABSTRACT

A method involving a network slice and applied to a base station includes: determining one or more first network slices capable of self support; generating first network slice information, the first network slice information being used to characterize each first network slice; and sending the first network slice information to a terminal so that the terminal determines each first network slice which may be supported by a base station according to the first network slice information. Reliability of using a network slice can therefore be improved.

17 Claims, 10 Drawing Sheets

One or more first network slices capable of being supported by the based station are determined — 110

First network slice information is generated, here the first network slice information is used to characterize each of the first network slices — 120

The first network slice information is transmitted to the terminal, to enable the terminal to determine, according to the first network slice information, each of the first network slices capable of being supported by the base station — 130

(51) Int. Cl.
*H04W 48/16* (2009.01)
*H04W 48/18* (2009.01)

(56) References Cited

U.S. PATENT DOCUMENTS

| | | | |
|---|---|---|---|
| 2018/0262954 A1 | 9/2018 | Wu | |
| 2018/0324645 A1 | 11/2018 | Park et al. | |
| 2018/0352501 A1* | 12/2018 | Zhang | H04W 48/18 |
| 2020/0145818 A1* | 5/2020 | Lee | H04W 12/037 |

FOREIGN PATENT DOCUMENTS

| | | |
|---|---|---|
| CN | 107111597 A | 8/2017 |
| CN | 107889259 A | 4/2018 |
| CN | 108174392 A | 6/2018 |
| CN | 108282846 A | 7/2018 |
| CN | 108307474 A | 7/2018 |
| CN | 108347751 A | 7/2018 |
| CN | 108810993 A | 11/2018 |
| EP | 3247169 A1 | 11/2017 |
| EP | 3343980 A1 | 7/2018 |
| WO | 2018141134 A1 | 8/2018 |
| WO | 2018176482 A1 | 10/2018 |
| WO | 2018203258 A1 | 11/2018 |

OTHER PUBLICATIONS

ERICSSON: "Signalling aspects of network slicing" 3GPP Draft; R2-1704166-Signalling Aspects of Network Slicing, 3rd Generation Partnership Project(3GPP), Mobile Competence Centre; 650, Route Des Lucioles: F-06921 Sophia-Antipolis Cedex; France, vol. RAN WG2, No. Hangzhou, China;May 19, 2017 May 5, 2017 (May 5, 2017), XP051263747, Retrieved from the Internet: URL: http://www.3gpp.org/ftp/tsg_ran/WG2_RL2/TSGR2_98/Docs/[retrieved on May 5, 2017]*the whole document*.

ZTE Corporation et al:"Leftover issues for NW slicing" 3GPP Draft; R2-1800449_LEFTOVER Issues for NW Slicing, 3rd Generation Partnership Project (3GPP), Mobile Competence Centre, 650, Route Des LUCIOLESF-06921 Sophia-Antipolis Cedex; France, vol. RAN WG2, No. Vancouver, Canada; Jan. 22, 2018-Jan. 26, 2018 Jan. 11, 2018 (Jan. 11, 2018), XP051385729, Retrieved from the Internet:URL: http://www.3gpp.org/ftp/tsg%5Fran/WG2%5FRL2/TSGR2%5FAHs/2018%5F01%5FNR/Docs/[retrieved on Jan. 22, 2018]*.

Supplementary European Search Report in the European application No. 18940033.6, dated May 11, 2022.

LG Electronics Inc. "Assistance information delivery for E-UTRA connected to 5GC" 3GPP TSG-RAN WG2 Meeting #100 R2-17137, Reno, USA, Nov. 27-Dec. 1, 2017.

Yang Li, Li Dapeng, "Realization and Trend of Network Slicing in 5G NG-RAN", DOI : 10.12142/ZTETJ.201906002, Dec. 11, 2019.

Notice of Allowance of the Chinese application No. 201880002531.0, dated Jan. 10, 2022.

International Search Report in the international application No. PCT/CN2018/115611, dated Aug. 14, 2019.

English translation of the Written Opinion of the International Search Authority in the international application No. PCT/CN2018/115611, dated Aug. 14, 2019.

First Office Action of the Chinese application No. 201880002531.0, dated Apr. 26, 2021.

* cited by examiner

METHOD AND DEVICE FOR USING NETWORK SLICE

CROSS-REFERENCE TO RELATED APPLICATIONS

This application is a national stage of International Application No. PCT/CN 2018/115611 filed on Nov. 15, 2018, the disclosure of which is hereby incorporated by reference in its entirety.

TECHNICAL FIELD

The present disclosure relates to the field of communication technologies, and more particularly, to a method and an apparatus for using a network slice.

BACKGROUND

In a new generation communication system, network slicing is introduced in order to meet personalized requirements of different services. That is, by slicing network resources, a single physical network can be divided into multiple logical virtual networks. An independent network slice is allocated for a typical service scenario, and in the slice, an enhanced network architecture is designed for a service requirement to achieve the proper resource allocation and process optimization. Moreover, multiple network slices share a network infrastructure, thereby improving utilization of the network resources and providing optimal support for different services used by different user groups. However, there is no optimization solution for how to use the network slices in the related art.

SUMMARY

To overcome the problems in the related art, the embodiments of the present disclosure provide a method and an apparatus for using a network slice.

According to a first aspect of an embodiment of the present disclosure, there is provided a method for using a network slice, applied to a base station. The method includes the following operations.

One or more first network slices capable of being supported by the base station is determined.

First network slice information is generated, here, the first network slice information is used to characterize each of the first network slices.

The first network slice information is transmitted to a terminal, to enable the terminal to determine, according to the first network slice information, each of the first network slices capable of being supported by the base station.

Optionally, the first network slice information includes a single network slice selection assistance information S-NSSAI list, and the S-NSSAI list includes network slice identifiers for identifying the first network slices.

Optionally, the operation that the first network slice information is transmitted to the terminal includes the following operations.

The first network slice information is added into a system message.

The system message is transmitted to the terminal, to enable the terminal to obtain the first network slice information from the system message.

Optionally, the system message includes at least one of: a master information block MIB; a system information block SIB1; or, a designated information block, here, the designated information block is an information block, specially established by the base station, for carrying the network slice information.

Optionally, after the first network slice information is transmitted to the terminal, the method further includes the following operations.

Second network slice information transmitted by the terminal is received, here, the second network slice information is used to characterize at least one third network slice, and the third network slice is at least one network slice, matching at least one of the first network slices, among one or more second network slices required by the terminal.

A corresponding first access and mobility management function AMF is selected for the terminal according to the third network slice, in response to an access and mobility management function AMF being required to be selected for the terminal.

First indication information is generated, here, the first indication information is used to characterize the first AMF.

The first indication information is transmitted to the terminal, to enable the terminal to determine the first AMF according to the first indication information.

Optionally, the operation that the first indication information is transmitted to the terminal includes the following operations.

The first indication information is added into a radio resource control RRC setup complete signaling.

The RRC setup complete signaling is transmitted to the terminal, to enable the terminal to obtain the first indication information from the RRC setup complete signaling.

Optionally, after the first network slice information is transmitted to the terminal, the method further includes the following operations.

A default second access and mobility management function AMF is selected for the terminal, in response to an AMF being required to be selected for the terminal.

Second indication information is generated, here, the second indication information is used to characterize the second AMF.

The second indication information is transmitted to the terminal, to enable the terminal to determine the second AMF according to the second indication information.

According to a second aspect of an embodiment of the present disclosure, there is provided a method for using a network slice, applied to a terminal. The method includes the following operations.

First network slice information transmitted by a base station is received, here, the first network slice information is used to characterize one or more first network slices capable of being supported by the base station.

Each of the first network slices capable of being supported by the base station is determined according to the first network slice information.

Optionally, the first network slice information includes a single network slice selection assistance information S-NSSAI list, and the S-NSSAI list includes network slice identifiers for identifying the first network slices.

Optionally, the operation that the first network slice information transmitted by the base station is received includes the following operations.

A system message transmitted by the base station is received, here, the system message includes the first network slice information.

The first network slice information is obtained from the system message.

Optionally, the system message includes at least one of:
a master information block MIB;
a system information block SIB1; or,
a designated information block, here, the designated information block is an information block, specially established by the base station, for carrying the network slice information.

Optionally, the method further includes the following operations.

One or more second network slices required by the terminal is determined.

It is determined whether at least one third network slice, matching at least one of the first network slices, exists among the second network slices.

Second network slice information is generated in response to determining that at least one third network slice, matching at least one of the first network slices, exists among the second network slices, here, the second network slice information is used to characterize each of the at least one third network slice; and the second network slice information is transmitted to the base station, to enable the base station to determine each of the at least one third network slice according to the second network slice information.

No second network slice information is generated in response to determining that no third network slice, matching any one of the first network slices, exists among the second network slices.

Optionally, the method further includes the following operations.

First indication information transmitted by the base station is received, here, the first indication information is used to characterize a first access and mobility management function AMF, and the first AMF is a corresponding AMF selected by the base station for the terminal according to the third network slice.

The first AMF is determined according to the first indication information.

Optionally, the operation that the first indication information transmitted by the base station is received includes the following operations.

A radio resource control RRC setup complete signaling transmitted by the base station is received, here, the RRC setup complete signaling includes the first indication information.

The first indication information is obtained from the RRC setup complete signaling.

Optionally, the method further includes the following operations.

Second indication information transmitted by the base station is received, here, the second indication information is used to characterize a second access and mobility management function AMF, and the second AMF is a default AMF selected by the base station for the terminal.

The second AMF is determined according to the second indication information.

According to a third aspect of an embodiment of the present disclosure, there is provided an apparatus for using a network slice, for use in a base station. The apparatus includes the following modules.

A determining module, configured to determine one or more first network slices capable of being supported by the base station.

A first generating module, configured to generate first network slice information, here, the first network slice information is used to characterize each of the first network slices.

A first transmitting module, configured to transmit the first network slice information to a terminal, to enable the terminal to determine, according to the first network slice information, each of the first network slices capable of being supported by the base station.

Optionally, the first network slice information includes a single network slice selection assistance information S-NS-SAI list, and the S-NSSAI list includes network slice identifiers for identifying the first network slices.

Optionally, the first transmitting module includes the following submodules.

A first adding submodule, configured to add the first network slice information into a system message.

A first transmitting submodule, configured to transmit the system message to the terminal, to enable the terminal to obtain the first network slice information from the system message.

Optionally, the system message includes at least one of:
a master information block MIB;
a system information block SIB1; or,
a designated information block, here, the designated information block is an information block, specially established by the base station, for carrying the network slice information.

Optionally, the apparatus further includes the following modules.

A receiving module, configured to: after transmitting the first network slice information to the terminal, receive second network slice information transmitted by the terminal, here, the second network slice information is used to characterize at least one third network slice, and the third network slice is at least one network slice, matching at least one of the first network slices, among one or more second network slices required by the terminal.

A first selecting module, configured to: select a corresponding first access and mobility management function AMF for the terminal according to the third network slice, in response to an access and mobility management function AMF being required to be selected for the terminal.

A second generating module, configured to generate first indication information, here, the first indication information is used to characterize the first AMF.

A second transmitting module, configured to transmit the first indication information to the terminal, to enable the terminal to determine the first AMF according to the first indication information.

Optionally, the second transmitting module includes the following submodules.

A second adding submodule, configured to add the first indication information into a radio resource control RRC setup complete signaling.

A second transmitting submodule, configured to transmit the RRC setup complete signaling to the terminal, to enable the terminal to obtain the first indication information from the RRC setup complete signaling.

Optionally, the apparatus further includes the following modules.

A second selecting module, configured to: after transmitting the first network slice information to the terminal, select a default second access and mobility management function AMF for the terminal, in response to an AMF being required to be selected for the terminal.

A third generating module, configured to generate second indication information, here, the second indication information is used to characterize the second AMF.

A third transmitting module, configured to transmit the second indication information to the terminal, to enable the terminal to determine the second AMF according to the second indication information. According to a fourth aspect of an embodiment of the present disclosure, there is provided an apparatus for using a network slice, for use in a terminal. The apparatus includes the following modules.

A first receiving module, configured to receive first network slice information transmitted by a base station, here, the first network slice information is used to characterize one or more first network slices capable of being supported by the base station.

A first determining module, configured to determine, according to the first network slice information, each of the first network slices capable of being supported by the base station.

Optionally, the first network slice information includes a single network slice selection assistance information S-NSSAI list, and the S-NSSAI list includes network slice identifiers for identifying the first network slices.

Optionally, the first receiving module includes the following submodules.

A first receiving submodule, configured to receive a system message transmitted by the base station, here, the system message includes the first network slice information.

A first obtaining submodule, configured to obtain the first network slice information from the system message.

Optionally, the system message includes at least one of:
a master information block MIB;
a system information block SIB1; or,
a designated information block, here, the designated information is an information block, specially established by the base station, for carrying the network slice information.

Optionally, the apparatus further includes the following modules.

A second determining module, configured to determine one or more second network slices required by the terminal.

A judgment module, configured to determine whether at least one third network slice, matching at least one of the first network slices, exists among the second network slices.

A first processing module, configured to: generate second network slice information in response to determining that at least one third network slice, matching at least one of the first network slices, exists among the second network slices, here, the second network slice information is used to characterize each of the at least one third network slice; and transmit the second network slice information to the base station, to enable the base station determine each of the at least one third network slice according to the second network slice information.

A second processing module, configured to: generate no second network slice information in response to determining that no third network slice, matching any one of the first network slices, exists among the second network slices.

Optionally, the apparatus further includes the following modules.

A second receiving module, configured to receive first indication information transmitted by the base station, here, the first indication information is used to characterize a first access and mobility management function AMF, and the first AMF is a corresponding AMF selected by the base station for the terminal according to the third network slice.

A third determining module, configured to determine the first AMF according to the first indication information.

Optionally, the second receiving module includes the following submodules.

A second receiving submodule, configured to receive a radio resource control RRC setup complete signaling transmitted by the base station, here, the RRC setup complete signaling includes the first indication information.

A second obtaining submodule, configured to obtain the first indication information from the RRC setup complete signaling.

Optionally, the apparatus further includes the following modules.

A third receiving module, configured to receive second indication information transmitted by the base station, here, the second indication information is used to characterize a second access and mobility management function AMF, and the second AMF is a default AMF selected by the base station for the terminal.

A fourth determining module, configured to determine the second AMF according to the second indication information.

According to a fifth aspect of the embodiments of the present disclosure, there is provided a non-transitory computer-readable storage medium having stored thereon computer programs configured to perform the method for using the network slice provided in the first aspect.

According to a sixth aspect of the embodiments of the present disclosure, there is provided a non-transitory computer readable storage medium having stored thereon computer programs configured to perform the method for using the network slice provided in the second aspect.

According to a seventh aspect of the embodiments of the present disclosure, there is provided an apparatus for using a network slice, for use in a base station. The apparatus includes:
a processor; and
a memory, configured to store instructions executable by the processor.

Here, the processor is configured to:
determine one or more first network slices capable of being supported by the base station;
generate first network slice information, here, the first network slice information is used to characterize each of the first network slices; and
transmit the first network slice information to a terminal, to enable the terminal to determine, according to the first network slice information, each of the first network slices capable of being supported by the base station.

According to an eighth aspect of an embodiment of the present disclosure, there is provided an apparatus for using a network slice, for use in a terminal. The apparatus includes:
a processor; and a memory, configured to store instructions executable by the processor.

Here, the processor is configured to:
receive first network slice information transmitted by a base station, here, the first network slice information is used to characterize one or more first network slices capable of being supported by the base station; and
determine, according to the first network slice information, each of the first network slices capable of being supported by the base station.

The technical solution provided by the embodiments of the present disclosure may include the following advantages.

After the base station in the present disclosure determines one or more first network slices capable of being supported by the base station itself, the base station generates first network slice information, here, the first network slice information is used to characterize each of the first network slices; and transmits the first network slice information to the terminal, so that the terminal determines, according to the first network slice information, each of the first network slices capable of being supported by the base station, thereby improving reliability of using a network slice.

The terminal in the present disclosure receives first network slice information which is transmitted by the base station, here, the first network slice information is used to characterize one or more first network slices capable of being supported by the base station; and determines each of the first network slices capable of being supported by the base station according to the first network slice information, thereby improving reliability of using a network slice.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings characterize the same or similar elements unless otherwise represented. The implementations set forth in the following description of exemplary embodiments do not characterize all implementations consistent with the present disclosure. Instead, they are merely examples of apparatuses and methods consistent with aspects related to the present disclosure as recited in the appended claims.

The terms used in the present disclosure are only for the purpose of describing specific embodiments, and are not intended to limit the present disclosure. The singular forms "a/an" and "the" as well as "said" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms "first", "second", "third" and the like may be used in the present disclosure to describe various information, the information should not be limited to these terms. These terms are only used to distinguish the same type of information from each other. For example, without departing from the scope of the present disclosure, first information may also be referred to as second information, and similarly, second information may also be referred to as first information. Depending on the context, the word "if" as used herein can be interpreted as "when . . . " or "at the time of . . . " or "in response to determining that . . . ".

Figure 1:
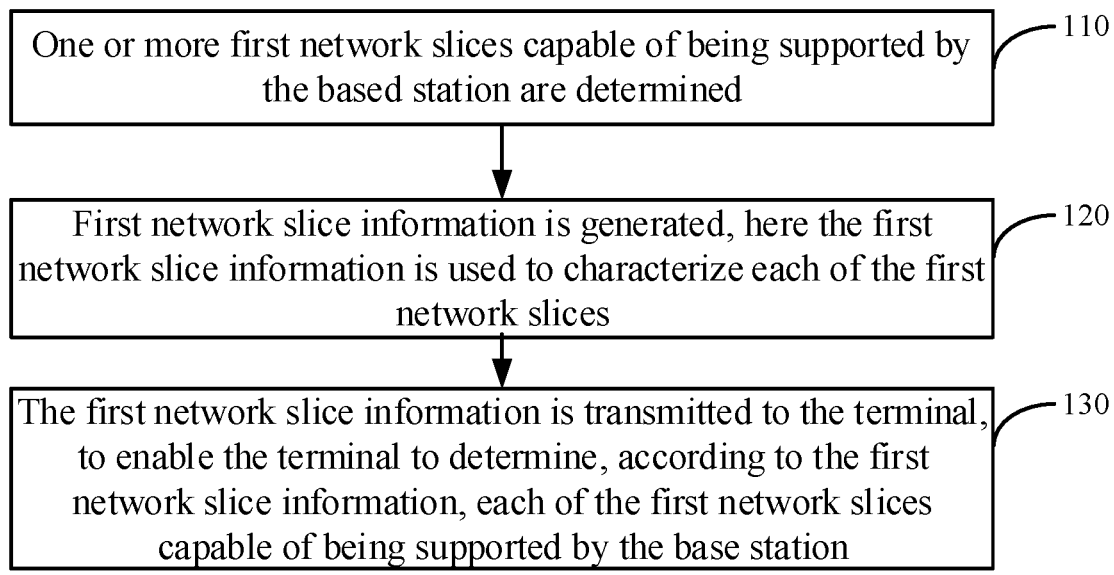
FIG. 1 is a flowchart of a method for using a network slice according to an exemplary embodiment.
Figure 2:
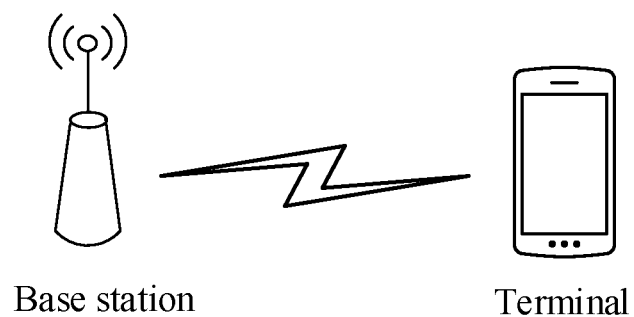
FIG. 2 is a diagram of an application scenario of a method for using a network slice according to an exemplary embodiment.

FIG. 1 is a flowchart of a method for using a network slice according to an exemplary embodiment, and FIG. 2 is a diagram of an application scenario of a method for using a network slice according to an exemplary embodiment. The method for using the network slice is applied to a base station, as illustrated in FIG. 1, and the method for using the network slice includes the following operations 110-130.

In operation 110, one or more first network slices capable of being supported by the based station are determined.

In the embodiment of the present disclosure, the first network slice refers to a network slice capable of being supported by the base station. For example, the network slices capable of being supported by the base station include a network slice 1 and a network slice 2.

In operation 120, first network slice information is generated, here, the first network slice information is used to characterize each of the first network slices.

In the embodiment of the present disclosure, the base station informs a terminal of each of the first network slices capable of being supported by the base station through the first network slice information.

In one embodiment, the first network slice information includes an S-NSSAI (Single Network Slice Selection Assistance Information) list, and the S-NSSAI list includes network slice identifiers for identifying the first network slices. Here, each S-NSSAI is used to identify a respective one of the network slices.

For example, the network slices capable of being supported by the base station include a network slice 1 and a network slice 2. In the S-NSSAI list, a network slice identifier for identifying the network slice 1 is 1, and a network slice identifier for identifying the network slice 2 is 2.

In operation 130, the first network slice information is transmitted to the terminal, to enable the terminal to determine, according to the first network slice information, each of the first network slices capable of being supported by the base station.

In one embodiment, when the operation 130 is performed, the base station transmits the first network slice information to the terminal via a system message. The specific process includes the following operations.

(1-1) The first network slice information is added into the system message.

(1-2) The system message is transmitted into the terminal, to enable the terminal to obtain the first network slice information from the system message.

In one embodiment, the system message in (1-1) above includes, but is not limited to, at least one of:

(2-1) an MIB (Master Information Block);
(2-2) an SIB1 (System Information Block); or,
(2-3) a designated information block, here, the designated information block is an information block, specially established by the base station, for carrying the network slice information.

In an exemplary scenario, as illustrated in FIG. 2, a base station and a terminal are included. The base station, after determining one or more first network slices capable of being supported by the base station itself, generates first network slice information, here, the first network slice information is used to characterize each of the first network slices; and transmits the first network slice information to the terminal, so that the terminal determines, according to the first network slice information, each of the first network slices capable of being supported by the base station.

It can be seen from the above embodiment that after determining one or more first network slices capable of being supported by the base station itself, the base station generates first network slice information, here the first network slice information is used to characterize each of the first network slices, and transmits the first network slice information to the terminal, so that the terminal determines, according to the first network slice information, each of the first network slices capable of being supported by the base station, thereby improving reliability of using a network slice.

Figure 3:
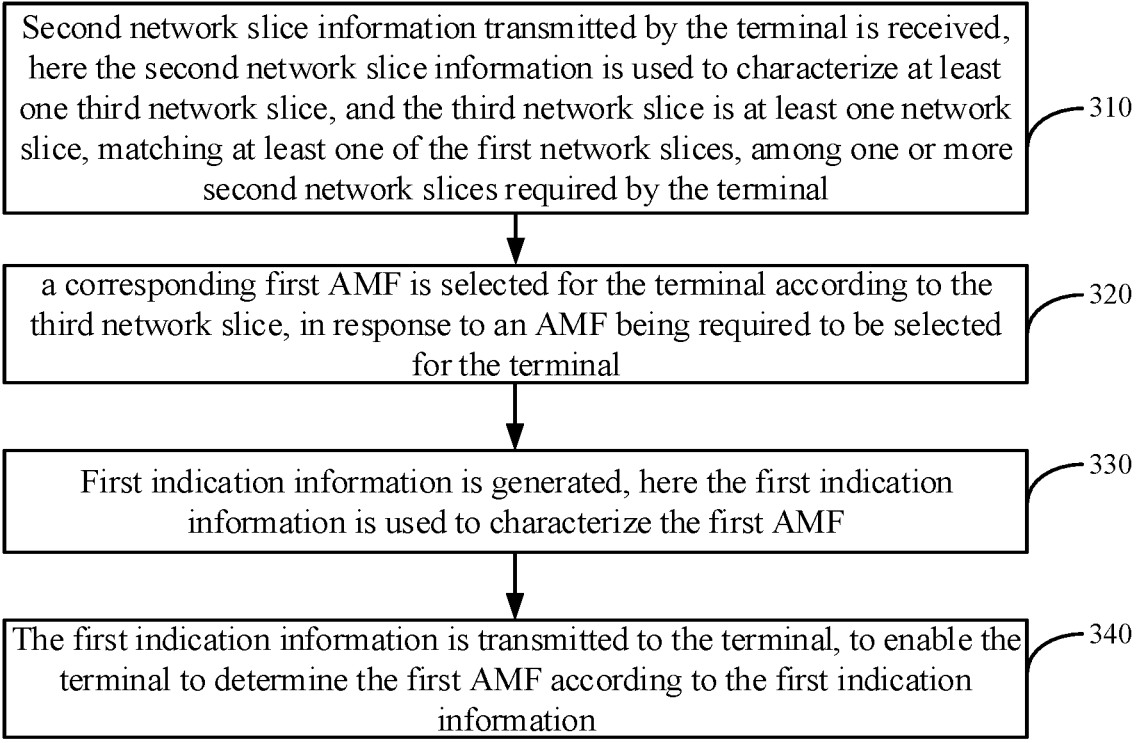
FIG. 3 is a flowchart of another method for using a network slice according to an exemplary embodiment.

FIG. 3 is a flowchart of another method for using a network slice according to an exemplary embodiment. The method for using the network slice is applied to a base station and is established based on the method illustrated in FIG. 1. After performing the operation 130, as illustrated in FIG. 3, the method for using the network slice further includes the following operations 310-340.

In operation 310, second network slice information transmitted by the terminal is received, here, the second network slice information is used to characterize at least one third network slice, and the third network slice is at least one network slice, matching at least one of the first network slices, among one or more second network slices required by the terminal.

In the embodiment of the present disclosure, after the base station informs the terminal of each of the first network slices capable of being supported by the base station, the terminal determines whether at least one third network slice, matching at least one of the first network slices, exists among one or more second network slices required by the terminal. If at least one third network slice, matching at least one of the first network slices, exists among the second network slices, the terminal informs the base station of the least one third network slice. If no third network slice, matching any one of the first network slices, exists among the second network slices, the terminal does not inform the base station of the second network slices required by the terminal. Here, a method for determining whether at least one third network slice matching at least one of the first network slices exists is to determine whether the third network slice is capable of being supported by the base station. If the third network slice is capable of being supported by the base station, this means that the third network slice matches at least one of the first network slices; if the third network slice is not capable of being supported by the base station, this means that the third network slice does not match any one of the first network slices.

For example, if the first network slices capable of being supported by the base station includes the network slice 1 and the network slice 2, and the second network slice required by the terminal includes the network slice 1, it is determined that the base station is capable of supporting the network slice 1. That is to say, it indicates that the network slice 1 matches one of the first network slices, and the terminal informs the base station of the network slice 1.

For another example, if the first network slices capable of being supported by the base station includes the network slice 1 and the network slice 2, and the second network slice required by the terminal includes the network slice 3, it is determined that the base station is not capable of supporting the network slice 3. That is to say, it indicates that the network slice 3 does not match any one of the first network slices, and the terminal is not required to inform the base station of the network slice 3.

For another example, if the first network slices capable of being supported by the base station includes the network slice 1 and the network slice 2, and the second network slices required by the terminal includes the network slice 1 and a network slice 3, it is determined that the base station is capable of supporting the network slice 1 but is not capable of supporting the network slice 3. That is to say, it indicates that the network slice 1 matches one of the first network slices, but the network slice 3 does not match any one of the first network slices, thus the terminal is required to inform the base station of the network slice 1, but is not required to inform the base station of the network slice 3.

In operation 320, a corresponding first AMF (Access and Mobility Management Function) is selected for the terminal according to the third network slice, in response to an AMF being required to be selected for the terminal.

In the embodiment of the present disclosure, the AMF is a function of a core network and different AMFs are identified by AMF names. Moreover, according to the configuration of the operator, each AMF is capable of serving at least one network slice. If the terminal requires the network slice 1, the base station selects an AMF capable of serving the network slice 1 for connection. Here, one AMF may serve multiple network slices. Similarly, one network slice may also be served by multiple AMFs.

In operation 330, first indication information is generated, here, the first indication information is used to characterize the first AMF.

In the embodiment of the present disclosure, the base station informs the terminal of which AMF is selected for the terminal through the first indication information.

In operation 340, the first indication information is transmitted to the terminal, to enable the terminal to determine the first AMF according to the first indication information.

In one embodiment, when the operation 340 is performed, the base station transmits the first indication information to the terminal through RRC (Radio Resource Control) setup complete signaling. The specific process includes the following operations.

(3-1) The first indication information is added into an RRC setup complete signaling.

(3-2) The RRC setup complete signaling is transmitted to the terminal, to enable the terminal to obtain the first indication information from the RRC setup complete signaling.

It can be seen from the above embodiment that upon reception of the second network slice information transmitted by the terminal, the corresponding first AMF can be selected for the terminal according to the third network slice, and the first indication information is generated, here, the first indication information is used to characterize the first AMF; and the first indication information is transmitted to the terminal, so that the terminal determines the first AMF according to the first indication information, thereby realizing the function of the base station selecting the corresponding AMF for the terminal according to the requirements of the terminal, and further improving the accuracy of the AMF selection.

Figure 4:
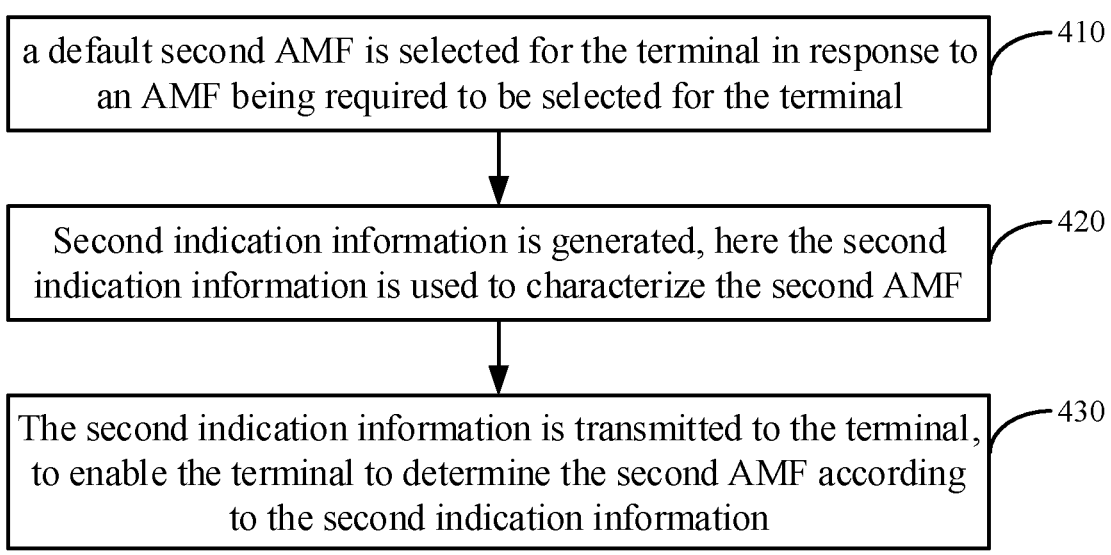
FIG. 4 is a flowchart of yet another method for using a network slice according to an exemplary embodiment.

FIG. 4 is a flowchart of yet another method for using a network slice according to an exemplary embodiment. The method for using the network slice is applied to a base station, and is established on the basis of the method illustrated in FIG. 1. After performing the operation 130, as illustrated in FIG. 4, the method for using the network slice further includes the following operations 410-430.

In operation 410, a default second AMF is selected for the terminal in response to an AMF being required to be selected for the terminal.

In the embodiment of the present disclosure, if the base station does not receive the second network slice reported and required by the terminal itself, or the terminal does not have a mechanism for reporting the second network slice required by the terminal itself, or the terminal is not required to report the second network slice required by the terminal itself because each second network slice does not match any one of the first network slices, or the like, then the base station selects the default second AMF for the terminal. The second AMF may be a default AMF set by the operator.

In operation 420, second indication information is generated, here, the second indication information is used to characterize the second AMF.

In the embodiment of the present disclosure, the base station informs the terminal of which default AMF is selected for the terminal through the second indication information.

In operation 430, the second indication information is transmitted to the terminal, to enable the terminal to determine the second AMF according to the second indication information.

In the embodiment of the present disclosure, the base station transmits the second indication information to the terminal through an RRC setup complete signaling. The specific process may refer to the process in which the first indication information is transmitted to the terminal through the RRC setup complete signaling, the detail of which is not described herein.

It can be seen from the above embodiment that if an AMF is required to be selected for the terminal, a default second AMF can be selected for the terminal, and the second indication information is generated, here, the second indication information is used to characterize the second AMF; and the second indication information is transmitted to the terminal, so that the terminal can determine the second AMF according to the second indication information, thereby meeting the requirements of different AMF configuration scenarios, and improving practicality of AMF configuration.

Figure 5:
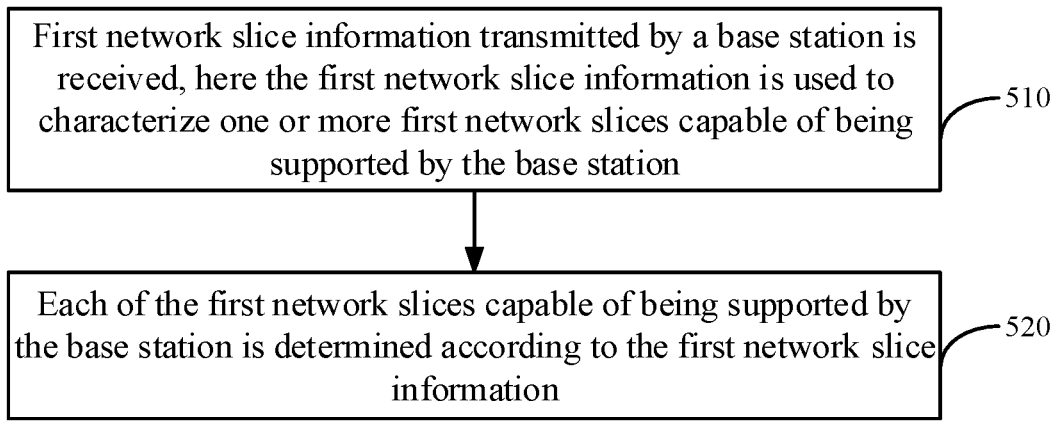
FIG. 5 is a flowchart of a method for using a network slice according to an exemplary embodiment.

FIG. 5 is a flowchart of a method for using a network slice according to an exemplary embodiment. The method for using the network slice is applied to a terminal. As illustrated in FIG. 5, the method for using the network slice includes the following operations 510-520.

In operation 510, first network slice information transmitted by a base station is received, here, the first network slice information is used to characterize one or more first network slices capable of being supported by the base station.

In one embodiment, the first network slice information includes an S-NSSAI list, and the S-NSSAI list includes network slice identifiers for identifying the first network slices. Here, an S-NSSAI is used to identify a network slice.

For example, network slices capable of being supported by the base station include a network slice 1 and a network slice 2. In the S-NSSAI list, a network slice identifier for identifying the network slice 1 is 1, and a network slice identifier for identifying the network slice 2 is 2.

In one embodiment, when performing the operation 510, since the base station is capable of transmitting the first network slice information to the terminal through a system message, the terminal is capable of obtaining the first network slice information through the system message accordingly. The specific process includes the following operations.

(4-1) A system message transmitted by the base station is received, here, the system message includes the first network slice information.

(4-2) The first network slice information is obtained from the system message.

In one embodiment, the system message in (4-1) above includes, but is not limited to, at least one of:

(5-1) an MIB (Master Information Block);

(5-2) an SIB1 (System Information Block); or, (5-3) a designated information block, here, the designated information block is an information block, specially established by the base station, for carrying the network slice information.

In operation 520, each of the first network slices capable of being supported by the base station is determined according to the first network slice information.

As can be seen from the above embodiment, the first network slice information transmitted by the base station is received, here, the first network slice information is used to characterize one or more first network slices capable of being supported by the base station, and each of the first network slices capable of being supported by the base station is determined according to the first network slice information, thereby improving reliability of using a network slice.

Figure 6:
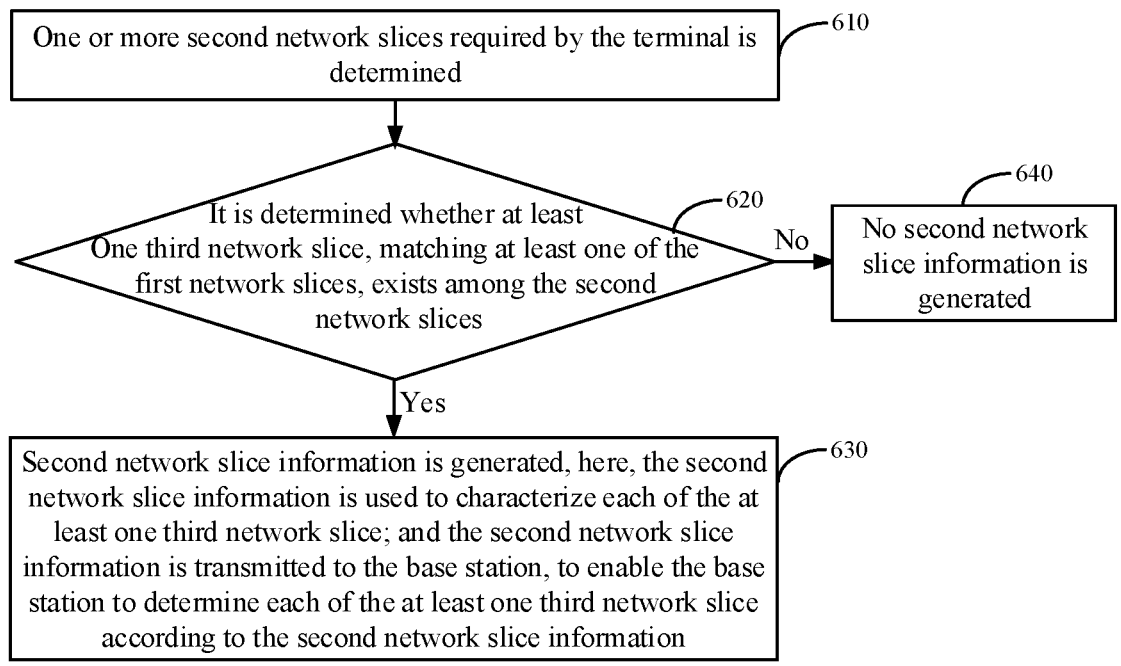
FIG. 6 is a flowchart of another method for using a network slice according to an exemplary embodiment.

FIG. 6 is a flowchart of another method for using a network slice according to an exemplary embodiment. The method for using the network slice is applied to a terminal and is established based on the method illustrated in FIG. 5. As illustrated in FIG. 6, the method for using the network slice further includes the following operations 610-640.

In operation 610, one or more second network slices required by the terminal is determined.

In operation 620, it is determined whether at least one third network slice, matching at least one of the first network slices, exists among the second network slices. In response to determining that at least one third network slice, matching at least one of the first network slices, exists among the second network slices, operation 630 is performed. In response to determining that no third network slice, matching any one of the first network slices, exists among the second network slices, operation 640 is performed.

In the embodiment of the present disclosure, a method for determining whether at least one third network slice matches at least one of the first network slices is to determine whether the third network slice is capable of being supported by the base station. If the third network slice is capable of being supported by the base station, this means that the third network slice matches at least one of the first network slices; if the third network slice is not capable of being supported by the base station, this means that the third network slice does not match any one of the first network slices.

For example, if the first network slices capable of being supported by the base station includes the network slice 1 and the network slice 2, and the second network slice required by the terminal includes the network slice 1, it is determined that the base station is capable of supporting the network slice 1. That is to say, it indicates that the network slice 1 matches one of the first network slices, and the terminal informs the base station of the network slice 1.

For another example, if the first network slices capable of being supported by the base station includes the network slice 1 and the network slice 2, and the second network slice required by the terminal includes the network slice 3, it is determined that the base station is not capable of supporting the network slice 3. That is to say, it indicates that the network slice 3 does not match any one of the first network slices, and the terminal is not required to inform the base station of the network slice 3 required by the terminal.

In operation 630, second network slice information is generated, here, the second network slice information is used to characterize each of the at least one third network slice; and the second network slice information is transmitted to the base station, to enable the base station to determine each of the at least one third network slice according to the second network slice information.

In operation 640, no second network slice information is generated.

In an embodiment, after the operation 630 is performed, the method for using the network slice further includes the following operations.

(6-1) First indication information transmitted by the base station is received, here, the first indication information is used to characterize a first access and mobility management function AMF, and the first AMF is a corresponding AMF selected by the base station for the terminal according to the third network slice.

(6-2) The first AMF is determined according to the first indication information.

In one embodiment, the first indication information is obtained from RRC setup complete signaling when (6-1) is performed. The specific process includes the following operations.

(7-1) An RRC setup complete signaling transmitted by the base station is received, here, the RRC setup complete signaling includes the first indication information.

(7-2) The first indication information is obtained from the RRC setup complete signaling.

In an embodiment, after the operation 640 is performed, the method for using the network slice further includes the following operations.

(8-1) Second indication information transmitted by base station is received, here, the second indication information is used to characterize a second access and mobility management function AMF, and the second AMF is a default AMF selected by the base station for the terminal.

(8-2) The second AMF is determined according to the second indication information.

It can be seen from the above embodiment that one or more second network slices required by the terminal are determined, and it is determined whether at least one third network slice, matching at least one of the first network slices, exists among the second network slices; the second network slice information is generated in response to determining that the at least one third network slice, matching the at least one of the first network slices, exists among the second network slices, here the second network slice information is used to characterize each of the at least one third network slice, and the second network slice information is transmitted to the base station, so that the base station can determine each of the at least one third network slice according to the second network slice information; and in response to an AMF being required to be selected for the terminal, a corresponding first AMF is selected for the terminal according to the third network slice, thereby improving the accuracy of AMF selection. In addition, in response to determining that no third network slice, matching any one of the first network slices, exists among the second network slices, no second network slice information is generated, so that the terminal is not required to report the network slice required by the terminal to the base station, thereby avoiding the waste of system resources and signaling.

Corresponding to the embodiments of the method for using the network slice, the present disclosure further provides the embodiments of an apparatus for using a network slice. Further, a part not described in detail in the embodiments of the apparatus for using the network slice may refer to the embodiments of the method for using the network slice.

Figure 7:
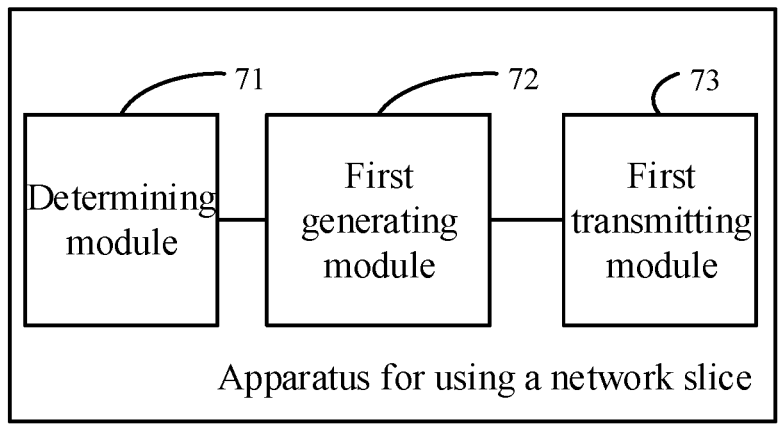
FIG. 7 is a block diagram of an apparatus for using a network slice according to an exemplary embodiment.

FIG. 7 is a block diagram of an apparatus for using a network slice according to an exemplary embodiment, and the apparatus for using the network slice is for use in a base station and is used for performing the method for using the network slice illustrated in FIG. 1. As illustrated in FIG. 7, the apparatus for using the network slice includes the following modules.

A determining module 71, configured to determine one or more first network slices capable of being supported by the base station.

A first generating module 72, configured to generate first network slice information, here, the first network slice information is used to characterize each of the first network slices.

A first transmitting module 73, configured to transmit the first network slice information to a terminal, to enable the terminal to determine, according to the first network slice information, each of the first network slices capable of being supported by the base station.

It can be seen from the above embodiment that after determining one or more first network slices capable of being supported by the base station itself, the base station generates first network slice information, here, the first network slice information is used to characterize each of the first network slices, and the base station transmits the first network slice information to the terminal, so that the terminal determines, according to the first network slice information, each of the first network slices capable of being supported by the base station, thereby improving reliability of using a network slice.

In one embodiment, based on the apparatus illustrated in FIG. 7, the first network slice information includes an S-NSSAI list, and the S-NSSAI list includes network slice identifiers for identifying the first network slices.

Figure 8:
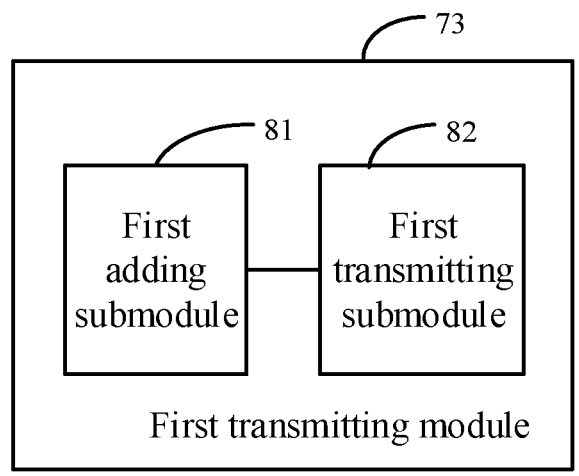
FIG. 8 is a block diagram of another apparatus for using a network slice according to an exemplary embodiment.

In one embodiment, based on the apparatus illustrated in FIG. 7, as illustrated in FIG. 8, the first transmitting module includes the following submodules.

A first adding submodule 81, configured to add the first network slice information into a system message.

A first transmitting submodule 82, configured to transmit the system message to the terminal, to enable the terminal to obtain the first network slice information from the system message.

In one embodiment, based on the apparatus illustrated in FIG. 8, the system message includes at least one of:
  a master information block MIB;
  a system information block SIB1; or,
  a designated information block, here, the designated information block is an information block, specially established by the base station, for carrying the network slice information.

Figure 9:
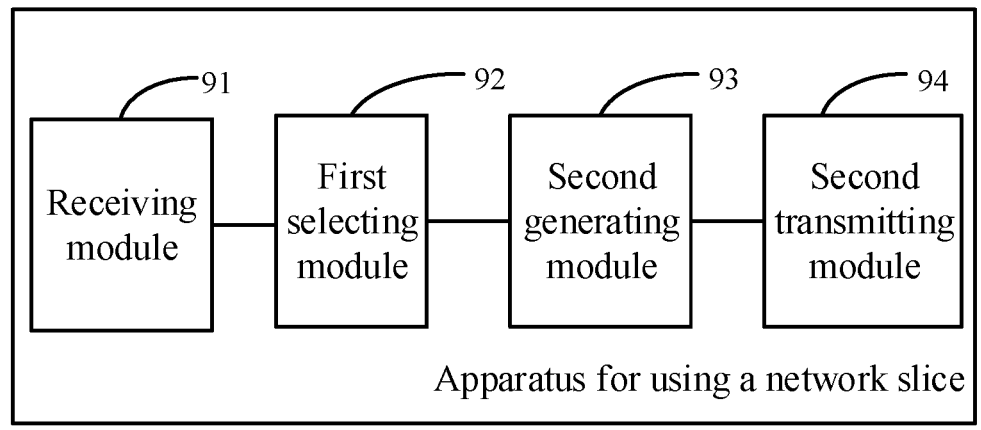
FIG. 9 is a block diagram of yet another apparatus for using a network slice according to an exemplary embodiment.

In one embodiment, based on the apparatus illustrated in FIG. 7, as illustrated in FIG. 9, the apparatus further includes the following modules.

A receiving module 91, configured to: after transmitting the first network slice information to the terminal, receive second network slice information transmitted by the terminal, here, the second network slice information is used to characterize at least one third network slice, and the third network slice is at least one network slice, matching at least one of the first network slices, among one or more second network slices required by the terminal.

A first selecting module 92, configured to: select a corresponding first access and mobility management function AMF for the terminal according to the third network slice, in response to an access and mobility management function AMF being required to be selected for the terminal.

A second generating module 93, configured to generate first indication information, here, the first indication information is used to characterize the first AMF.

A second transmitting module 94, configured to transmit the first indication information to the terminal, to enable the terminal to determine the first AMF according to the first indication information.

It can be seen from the above embodiment that upon reception of the second network slice information transmitted by the terminal, the corresponding first AMF can be selected for the terminal according to the third network slice, and first indication information is generated, here the first indication information is used to characterize the first AMF; and the first indication information is transmitted to the terminal, so that the terminal determines the first AMF according to the first indication information, thereby realizing the function of the base station selecting the corresponding AMF for the terminal according to the requirements of the terminal, and further improving the accuracy of the AMF selection.

Figure 10:
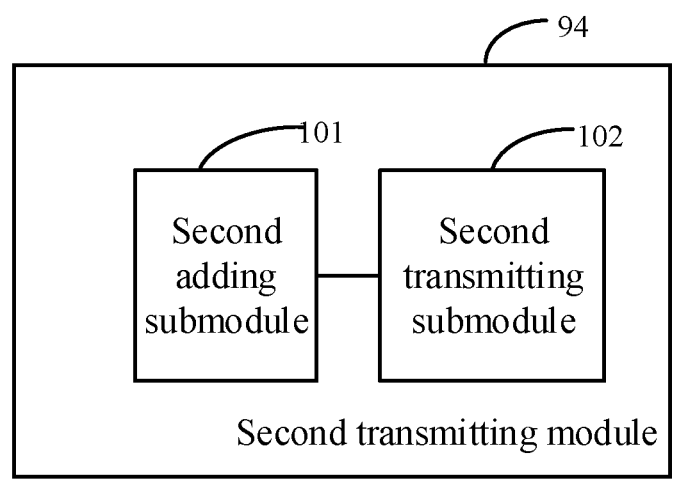
FIG. 10 is a block diagram of still another apparatus for using a network slice according to an exemplary embodiment.

In one embodiment, based on the apparatus illustrated in FIG. 9, as illustrated in FIG. 10, the second transmitting module 94 includes the following submodules.

A second adding submodule 101, configured to add the first indication information into a radio resource control RRC setup complete signaling.

A second transmitting submodule 102, configured to transmit the RRC setup complete signaling to the terminal, to enable the terminal to obtain the first indication information from the RRC setup complete signaling.

Figure 11:
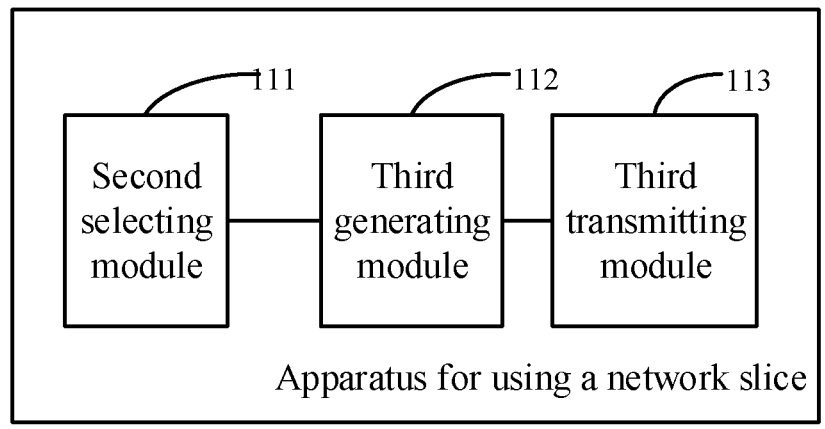
FIG. 11 is a block diagram of yet still another apparatus for using a network slice according to an exemplary embodiment.

In one embodiment, based on the apparatus illustrated in FIG. 7, as illustrated in FIG. 11, the apparatus further includes the following modules.

A second selecting module 111, configured to: after transmitting the first network slice information to the terminal, select a default second access and mobility management function AMF for the terminal, in response to an AMF being required to be selected for the terminal.

A third generating module 112, configured to generate second indication information, here, the second indication information is used to characterize the second AMF.

A third transmitting module 113, configured to transmit the second indication information to the terminal, to enable the terminal to determine the second AMF according to the second indication information.

It can be seen from the above embodiment that in response to an AMF being required to be selected for the terminal, a default second AMF can be selected for the terminal, and the second indication information is generated, here, the second indication information is used to characterize the second AMF; and the second indication information is transmitted to the terminal, so that the terminal can determine the second AMF according to the second indication information, thereby meeting the requirements of different AMF configuration scenarios, and improving practicality of AMF configuration.

Figure 12:
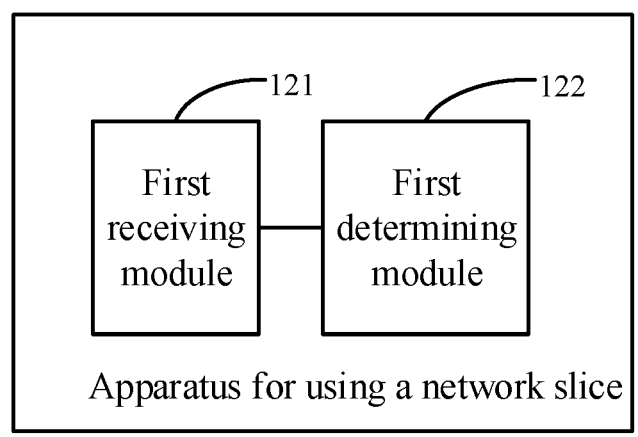
FIG. 12 is a block diagram of an apparatus for using a network slice according to an exemplary embodiment.

FIG. 12 is a block diagram of an apparatus for using a network slice according to an exemplary embodiment. The apparatus is for use in a terminal and is used to perform the method for using the network slice illustrated in FIG. 5. As illustrated in FIG. 12, the apparatus for using the network slice includes the following modules.

A first receiving module 121, configured to receive first network slice information transmitted by a base station, here, the first network slice information is used to characterize one or more first network slices capable of being supported by the base station.

A first determining module 122, configured to determine, according to the first network slice information, each of the first network slices capable of being supported by the base station.

As can be seen from the above embodiment, through receiving the first network slice information, which is transmitted by the base station, for characterizing one or more first network slices capable of being supported by the base station, and determining each of the first network slices capable of being supported by the base station according to the first network slice information, thereby improving reliability of using a network slice.

In one embodiment, based on the apparatus as illustrated in FIG. 12, the first network slice information includes an S-NSSAI list, and the S-NSSAI list includes network slice identifiers for identifying the first network slices.

Figure 13:
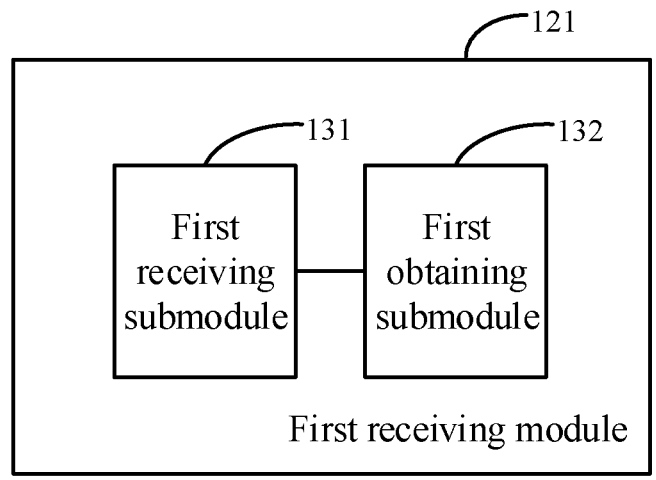
FIG. 13 is a block diagram of another apparatus for using a network slice according to an exemplary embodiment.

In one embodiment, based on the apparatus illustrated in FIG. 12, as illustrated in FIG. 13, the first receiving module 121 includes the following submodules.

A first receiving submodule 131, configured to receive a system message transmitted by the base station, here, the system message includes the first network slice information.

A first obtaining submodule 132, configured to obtain the first network slice information from the system message.

In one embodiment, based on the apparatus illustrated in FIG. 13, the system message includes at least one of:
  a master information block MIB;
  a system information block SIB1; or, a designated information block, here, the designated information block is an information block, specially established by the base station, for carrying the network slice information.

Figure 14:
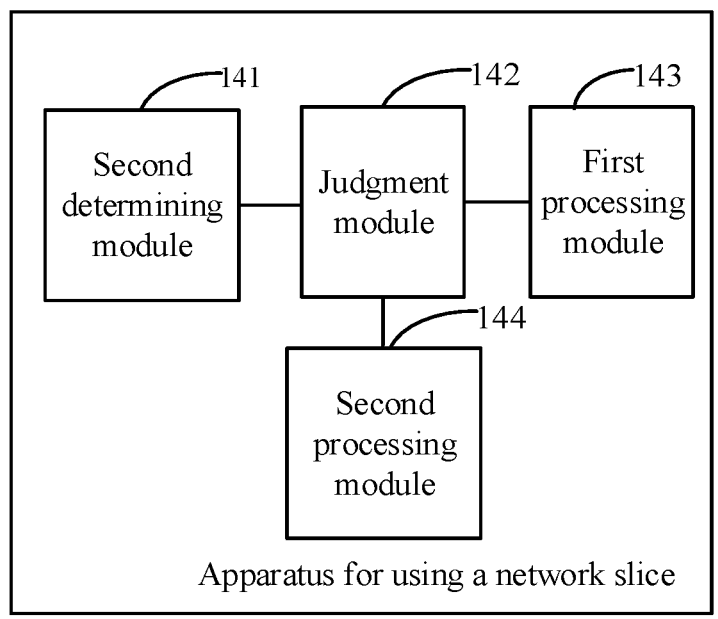
FIG. 14 is a block diagram of yet another apparatus for using a network slice according to an exemplary embodiment.

In one embodiment, based on the apparatus illustrated in FIG. 12, as illustrated in FIG. 14, the apparatus further includes the following modules.

A second determining module 141, configured to determine one or more second network slices required by the terminal.

A judgment module 142, configured to determine whether at least one third network slice, matching at least one of the first network slices, exists among the second network slices.

A first processing module 143, configured to: generate second network slice information in response to determining that at least one third network slice, matching at least one of the first network slices, exists among the second network slices, here, the second network slice information is used to characterize each of the at least one third network slice; and transmit the second network slice information to the base station, to enable the base station to determine each of the at least one third network slice according to the second network slice information.

A second processing module 144, configured to: generate no second network slice information in response to determining that no third network slice, matching any one of the first network slices, exists among the second network slices.

It can be seen from the above-mentioned embodiments that one or more second network slices required by the terminal are determined, and it is determined whether at least one third network slice, matching at least one of the first network slices, exists among the second network slices; the second network slice information is generated in response to determining that the at least one third network slice, matching the at least one of the first network slices, exists among the second network slices, here, the second network slice information is used to characterize each of the at least one third network slice, and the second network slice information is transmitted to the base station, so that the base station can determine each of the at least one third network slice according to the second network slice information; and in response to an AMF being required to be selected for the terminal, a corresponding first AMF is selected for the terminal according to the third network slice, thereby improving the accuracy of AMF selection. In addition, in response to determining that no third network slice, matching any one of the first network slices, exists among the second network slices, no second network slice information is generated, so that the terminal is not required to report the network slice required by the terminal to the base station, thereby avoiding the waste of system resources and signaling.

Figure 15:
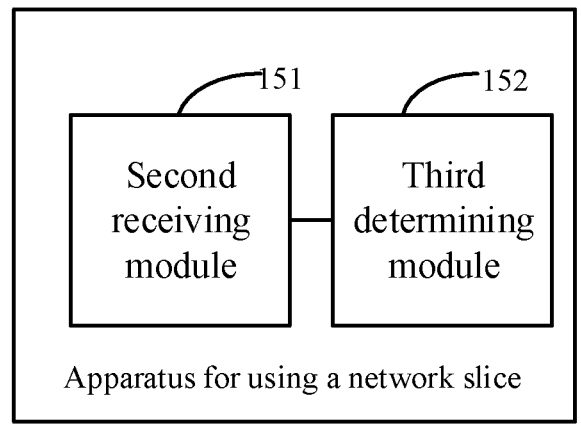
FIG. 15 is a block diagram of still another apparatus for using a network slice according to an exemplary embodiment.

In one embodiment, based on the apparatus illustrated in FIG. 14, as illustrated in FIG. 15, the apparatus further includes the following modules.

A second receiving module 151, configured to receive first indication information transmitted by the base station, here, the first indication information is used to characterize a first access and mobility management function AMF, and the first AMF is a corresponding AMF selected by the base station for the terminal according to the third network slice.

A third determining module 152, configured to determine the first AMF according to the first indication information.

Figure 16:
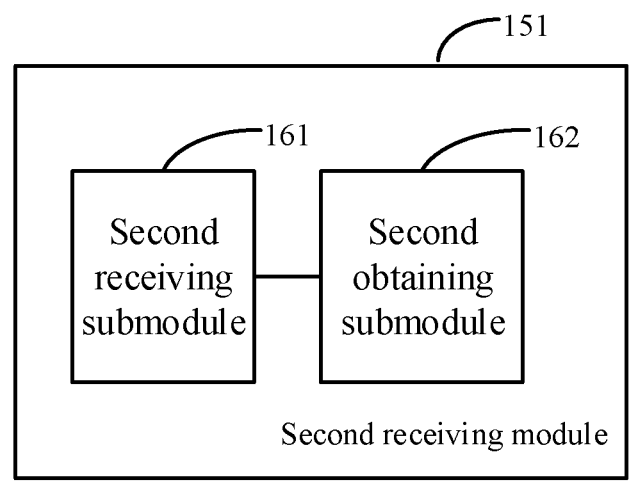
FIG. 16 is a block diagram of yet still another apparatus for using a network slice according to an exemplary embodiment.

In one embodiment, based on the apparatus illustrated in FIG. 15, as illustrated in FIG. 16, the second receiving module 151 includes the following submodules.

A second receiving submodule 161, configured to receive a radio resource control RRC setup complete signaling transmitted by the base station, here, the RRC setup complete signaling includes the first indication information.

A second obtaining submodule 162, configured to obtain the first indication information from the RRC setup complete signaling.

Figure 17:
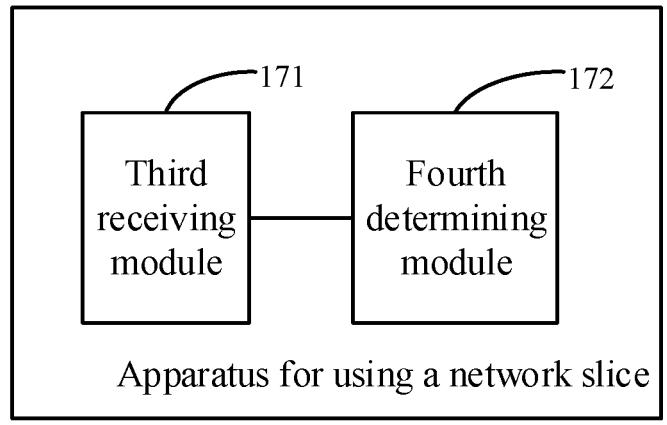
FIG. 17 is a block diagram of yet still another apparatus for using a network slice according to an exemplary embodiment.

In one embodiment, based on the apparatus illustrated in FIG. 12 or FIG. 14, as illustrated in FIG. 17, the apparatus further includes the following modules.

A third receiving module 171, configured to receive second indication information transmitted by the base station, here, the second indication information is used to characterize a second access and mobility management function AMF, and the second AMF is a default AMF selected by the base station for the terminal.

A fourth determining module 172, configured to determine the second AMF according to the second indication information.

For the apparatus embodiments, since the apparatus embodiments basically correspond to the method embodiments, the description related to the apparatus embodiments may refer to the description of the method embodiments. The apparatus embodiments described above are merely illustrative. The units described above as separate components may or may not be physically separate, and the components displayed as units may or may not be physical units, that is, they may be located in one unit, or distributed to multiple network units. Some or all of the modules can be selected according to actual needs to achieve the objectives of the solutions of the present disclosure. Those of ordinary skill in the art can understand and implement them without creative work.

Accordingly, the present disclosure further provides a non-transitory computer-readable storage medium having stored thereon computer programs configured to perform the method for using the network slice described in any one of FIG. 1 to FIG. 4.

Accordingly, the present disclosure further provides a non-transitory computer-readable storage medium having stored thereon computer programs configured to perform the method for using the network slice described in any one of FIG. 5 to FIG. 6.

Accordingly, the present disclosure further provides an apparatus for using a network slice, for use in a base station. The apparatus includes:
a processor; and
a memory, configured to store instructions executable by the processor.

Here, the processor is configured to:
determine one or more first network slices capable of being supported by the base station;
generate first network slice information, here, the first network slice information is used to characterize each of the first network slices; and
transmit the first network slice information to a terminal, to enable the terminal to determine, according to the first network slice information, each of the first network slices capable of being supported by the base station.

Figure 18:
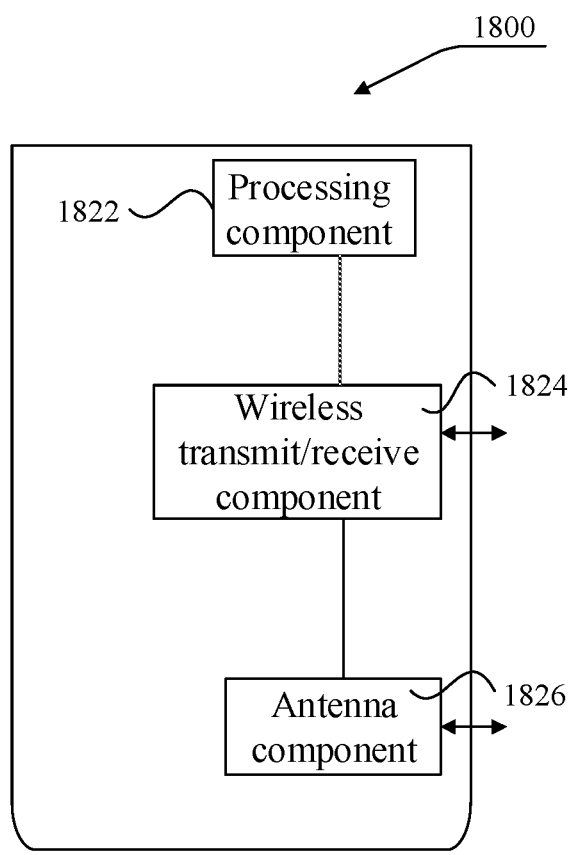
FIG. 18 is a structural diagram of an apparatus for using a network slice according to an exemplary embodiment.

As illustrated in FIG. 18, FIG. 18 is a structural diagram of an apparatus for using a network slice according to an exemplary embodiment. The apparatus 1800 may be provided as a base station. Referring to FIG. 18, the apparatus 1800 includes a processing component 1822 which further includes one or more processors, a wireless transmit/receive component 1824, an antenna component 1826, and a signal processing portion specific to the wireless interface.

One of the processors in processing component 1822 is configured to perform the aforementioned method for using the network slice.

Accordingly, the present disclosure further provides an apparatus for using a network slice, for use in a terminal. The apparatus includes:

a processor; and a memory, configured to store instructions executable by the processor.

Here, the processor is configured to:

receive first network slice information transmitted by a base station, here, the first network slice information is used to characterize one or more first network slices capable of being supported by the base station; and determine, according to the first network slice information, each of the first network slices capable of being supported by the base station.

Figure 19:
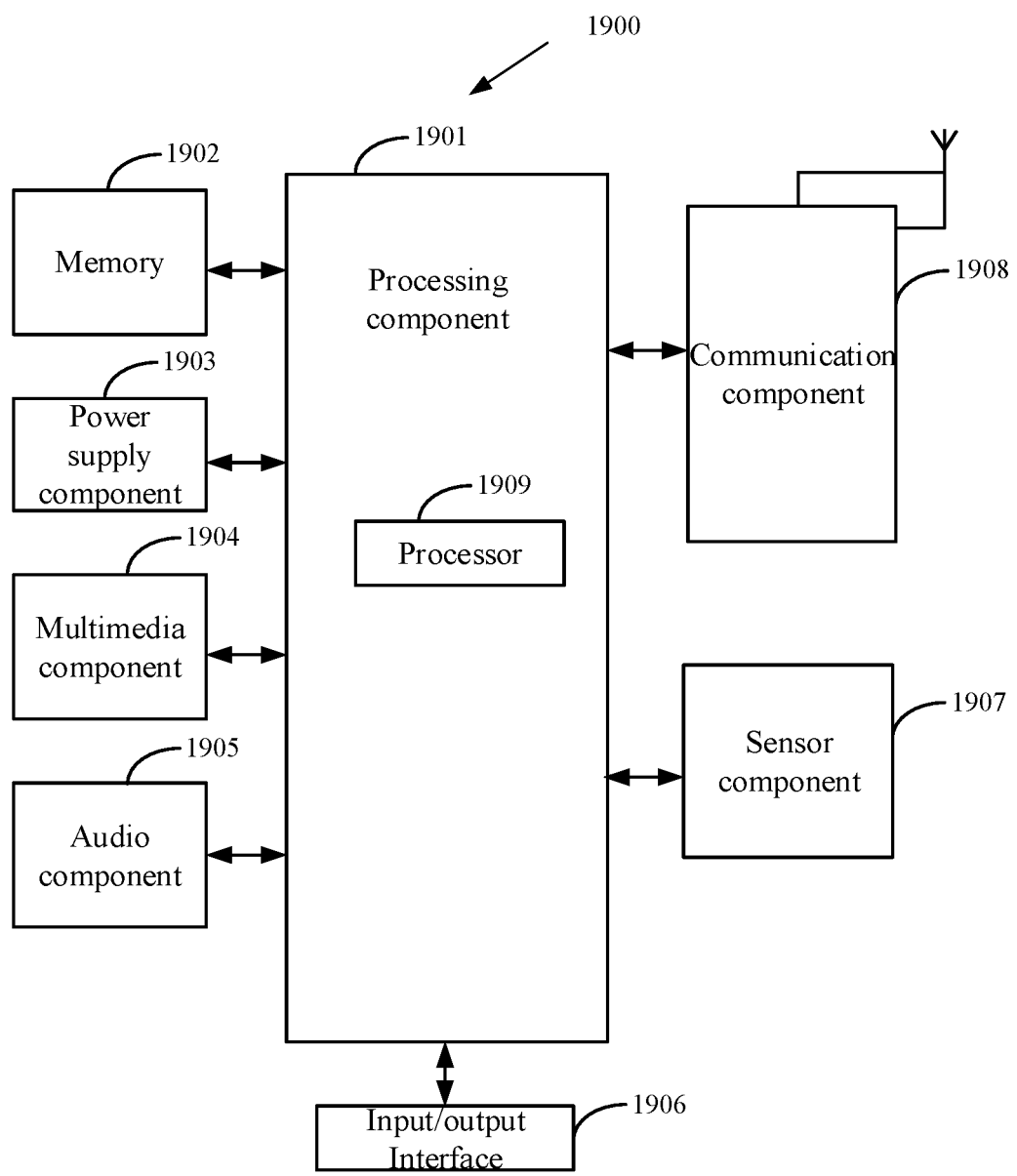
FIG. 19 is a structural diagram of an apparatus for using a network slice according to an exemplary embodiment.

FIG. 19 is a structural diagram of an apparatus for using a network slice according to an exemplary embodiment. As illustrated in FIG. 19, the apparatus 1900 for using the network slice according to the exemplary embodiment may be a terminal, such as a computer, a mobile phone, a digital broadcast terminal, a messaging devices, a game console, a tablet apparatus, a medical apparatus, an exercise apparatus, a personal digital assistant, or the like.

Referring to FIG. 19, the apparatus 1900 includes one or more of: a processing component 1901, a memory 1902, a power supply component 1903, a multimedia component 1904, an audio component 1905, an input/output (I/O) interface 1906, a sensor component 1907, and a communication component 1908.

The processing component 1901 generally controls the overall operations of the apparatus 1900, such as operations associated with displays, telephone calls, data communications, camera operations, and recording operations. The processing component 1901 may include one or more processors 1909 to execute instructions to perform all or part of the operations of the aforementioned methods. In addition, the processing component 1901 may include one or more modules to facilitate interaction between the processing component 1901 and other components. For example, the processing component 1901 may include a multimedia module to facilitate interaction between the multimedia component 1904 and the processing component 1901.

The memory 1902 is configured to store various types of data to support operations at the apparatus 1900. Examples of such data include instructions for any application or method operating on the apparatus 1900, contact data, phone book data, messages, pictures, video, etc. The memory 1902 may be implemented by any type of volatile or non-volatile storage devices or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 1903 provides power to various components of the apparatus 1900. The power supply component 1903 includes a power management system, one or more power supplies, and other components associated with generating, managing, and distributing power for the apparatus 1900.

The multimedia component 1904 includes a screen between the apparatus 1900 and the user that provides an output interface. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense gestures of touching and sliding on the touch panel. The touch sensor may not only sense the boundary of a touch or sliding action, but also detect the duration and pressure associated with the touch or sliding operation. In some embodiments, the multimedia component 1904 includes a front-facing camera and/or a rear-facing camera. The front-facing camera and/or the rear-facing camera receive external multimedia data when the apparatus 1900 is in an operating mode, such as a shooting mode or a video mode. Each of the front-facing camera and the rear-facing camera is a fixed optical lens system or has a focal length and optical zoom capability.

The audio component 1905 is configured to output and/or input audio signals. For example, the audio component 1905 includes a microphone (MIC) configured to receive an external audio signal when the apparatus 1900 is in an operating mode, such as a call mode, a recording mode, and a speech recognition mode. The received audio signal may be further stored in the memory 1902 or transmitted via the communication component 1908. In some embodiments, the audio component 1905 further includes a speaker for outputting audio signals.

The I/O interface 1906 provides an interface between the processing component 1901 and a peripheral interface module which may be a keyboard, a click wheel, a button, or the like. These buttons may include, but are not limited to, a home page button, a volume button, an activation button, and a lock button.

The sensor component 1907 includes one or more sensors for providing a state assessment of various aspects of the apparatus 1900. For example, the sensor component 1907 may detect an open/closed state of the apparatus 1900, relative positioning of a component. For example, the component may be a display and keypad of the apparatus 1900. The sensor component 1907 may also detect a change in position of the apparatus 1900 or a component of the apparatus 1900, the presence or absence of a contact between the user with the apparatus 1900, orientation or acceleration/deceleration of the apparatus 1900, and temperature change of the apparatus 1900. The sensor component 1907 may include a proximity sensor configured to detect the presence of a nearby object in the absence of any physical contact. The sensor component 1907 further includes a light sensor, such as a Complementary Metal-Oxide Semiconductor (CMOS) or Charge Coupled Device (CCD) image sensor, for use in imaging applications. In some embodiments, the sensor component 1907 further includes an acceleration sensor, a gyroscope sensor, a magnetic sensor, a pressure sensor, or a temperature sensor.

The communication component 1908 is configured to facilitate wired or wireless communication between the apparatus 1900 and other devices. The apparatus 1900 may access a wireless network based on a communication standard, such as WiFi, 2G or 3G, or a combination thereof. In one exemplary embodiment, the communication component 1908 receives broadcast signals or broadcast-related information from an external broadcast management system via a broadcast channel. In one exemplary embodiment, the communication component 1908 further includes a near field communication (NFC) module to facilitate short-range communication. For example, the NFC module may be implemented based on a Radio Frequency Identifier (RFID) technology, an Infrared Data Association (IrDA) technology, an Ultra Wideband (UWB) technology, a Bluetooth (BT) technology, and other technologies.

In an exemplary embodiment, the apparatus 1900 may be implemented by one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic elements for performing the aforementioned methods.

In an exemplary embodiment, there is also provided a non-transitory computer-readable storage medium, such as the memory 1902 including instructions. The instructions, when executed by the processor 1909 of the apparatus 1900, cause the processor to perform the aforementioned methods. For example, the non-transitory computer-readable storage medium may be a ROM, a random access memory (RAM), a CD-ROM, a magnetic tape, a floppy disk, an optical data storage device, or the like.

Here, the instructions in the storage medium, when are executed by the processor, cause the apparatus 1900 to execute any one of the aforementioned methods for using the network slice.

After considering the specification and practicing the disclosure disclosed herein, those skilled in the art will easily think of other embodiments of the present disclosure. The specification is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only to be regarded as exemplary, and the true scope and spirit of the present disclosure are pointed out by the following claims.

It should be understood that the present disclosure is not limited to the precise structure described above and illustrated in the drawings, and various modifications and changes can be made without departing from the scope of the present disclosure. The scope of the present disclosure is only limited by the appended claims.

The invention claimed is:

1. A method for using a network slice, applied to a base station, the method comprising:
    determining one or more first network slices capable of being supported by the base station;
    generating first network slice information, wherein the first network slice information is used to characterize each of the first network slices;
    transmitting the first network slice information to a terminal, to enable the terminal to determine, according to the first network slice information, each of the first network slices capable of being supported by the base station;
    receiving second network slice information transmitted by the terminal, wherein the second network slice information is used to characterize at least one third network slice, and the third network slice is at least one network slice, matching at least one of the first network slices, among one or more second network slices required by the terminal;
    selecting a corresponding first access and mobility management function AMF for the terminal according to the third network slice, in response to an access and mobility management function AMF being required to be selected for the terminal;
    generating first indication information, wherein the first indication information is used to characterize the first AMF; and
    transmitting the first indication information to the terminal, to enable the terminal to determine the first AMF according to the first indication information.

2. The method of claim 1, wherein the first network slice information comprises a single network slice selection assistance information S-NSSAI list, and the S-NSSAI list comprises network slice identifiers for identifying the first network slices.

3. The method of claim 1, wherein said transmitting the first network slice information to the terminal comprises:
    adding the first network slice information into a system message; and
    transmitting the system message to the terminal, to enable the terminal to obtain the first network slice information from the system message.

4. The method of claim 3, wherein the system message comprises at least one of:
    a master information block MIB;
    a system information block SIB1; or,
    a designated information block, wherein the designated information block is an information block, specially established by the base station, for carrying the network slice information.

5. The method of claim 1, wherein said transmitting the first indication information to the terminal comprises:
    adding the first indication information into a radio resource control RRC setup complete signaling; and
    transmitting the RRC setup complete signaling to the terminal, to enable the terminal to obtain the first indication information from the RRC setup complete signaling.

6. The method of claim 1, further comprising: after said transmitting the first network slice information to the terminal,
    selecting a default second access and mobility management function AMF for the terminal, in response to an AMF being required to be selected for the terminal;
    generating second indication information, wherein the second indication information is used to characterize the second AMF; and
    transmitting the second indication information to the terminal, to enable the terminal to determine the second AMF according to the second indication information.

7. A method for using a network slice, applied to a terminal, the method comprising:
    receiving first network slice information transmitted by a base station, wherein the first network slice information is used to characterize one or more first network slices capable of being supported by the base station;
    determining, according to the first network slice information, each of the first network slices capable of being supported by the base station;
    determining one or more second network slices required by the terminal;
    determining whether at least one third network slice, matching at least one of the first network slices, exists among the second network slices;
    generating second network slice information in response to determining that at least one third network slice, matching at least one of the first network slices, exists among the second network slices, wherein the second network slice information is used to characterize each of the at least one third network slice; and transmitting the second network slice information to the base station, to enable the base station to determine each of the at least one third network slice according to the second network slice information; and generating no second network slice information in response to determining that no third network slice, matching any one of the first network slices, exists among the second network slices.

8. The method of claim 7, wherein the first network slice information comprises a single network slice selection assistance information S-NSSAI list, and the S-NSSAI list comprises network slice identifiers for identifying the first network slices.

9. The method of claim 7, wherein said receiving the first network slice information transmitted by the base station comprises:

receiving a system message transmitted by the base station, wherein the system message comprises the first network slice information; and obtaining the first network slice information from the system message.

10. The method of claim 9, wherein the system message comprises at least one of:

a master information block MIB;

a system information block SIB1; or, a designated information block, wherein the designated information block is an information block, specially established by the base station, for carrying the network slice information.

11. The method of claim 7, further comprising:

receiving first indication information transmitted by the base station, wherein the first indication information is used to characterize a first access and mobility management function AMF, and the first AMF is a corresponding AMF selected by the base station for the terminal according to the third network slice; and determining the first AMF according to the first indication information.

12. The method of claim 11, wherein said receiving the first indication information transmitted by the base station comprises:

receiving a radio resource control RRC setup complete signaling transmitted by the base station, wherein the RRC setup complete signaling comprises the first indication information; and obtaining the first indication information from the RRC setup complete signaling.

13. The method of claim 7, further comprising:

receiving second indication information transmitted by the base station, wherein the second indication information is used to characterize a second access and mobility management function AMF, and the second AMF is a default AMF selected by the base station for the terminal; and determining the second AMF according to the second indication information.

14. An apparatus for using a network slice, for use in a base station, the apparatus comprising:

a processor;

a transceiver; and a memory for storing instructions executable by the processor to cause the processor to:

determine one or more first network slices capable of being supported by the base station;

generate first network slice information, wherein the first network slice information is used to characterize each of the first network slices;

transmit, through the transceiver, the first network slice information to a terminal, to enable the terminal to determine, according to the first network slice information, each of the first network slices capable of being supported by the base station;

receive, through the transceiver, second network slice information transmitted by the terminal, wherein the second network slice information is used to characterize at least one third network slice, and the third network slice is at least one network slice, matching at least one of the first network slices, among one or more second network slices required by the terminal;

select a corresponding first access and mobility management function AMF for the terminal according to the third network slice, in response to an access and mobility management function AMF being required to be selected for the terminal;

generate first indication information, wherein the first indication information is used to characterize the first AMF; and transmit, through the transceiver, the first indication information to the terminal, to enable the terminal to determine the first AMF according to the first indication information.

15. The apparatus of claim 14, wherein the first network slice information comprises a single network slice selection assistance information S-NSSAI list, and the S-NSSAI list comprises network slice identifiers for identifying the first network slices.

16. The apparatus of claim 14, wherein the processor is further configured to:

add the first indication information into a radio resource control RRC setup complete signaling; and transmit, through the transceiver, the RRC setup complete signaling to the terminal, to enable the terminal to obtain the first indication information from the RRC setup complete signaling.

17. The apparatus of claim 14, wherein the processor is further configured to:

after transmitting the first network slice information to the terminal, select a default second access and mobility management function AMF for the terminal, in response to an AMF being required to be selected for the terminal;

generate second indication information, wherein the second indication information is used to characterize the second AMF; and transmit, through the transceiver, the second indication information to the terminal, to enable the terminal to determine the second AMF according to the second indication information.

* * * * *